(12) United States Patent
Zhai et al.

(10) Patent No.: US 8,446,865 B2
(45) Date of Patent: May 21, 2013

(54) MULTI-CHANNEL DIRECTIONAL DEVICES WITH BEACONS

(75) Inventors: Hong Zhai, Ossining, NY (US); Chun-Ting Chou, Taipei (TW); Richard Chen, Croton-On-Hudson, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 573 days.

(21) Appl. No.: 12/522,955

(22) PCT Filed: Jan. 15, 2008

(86) PCT No.: PCT/IB2008/050136
§ 371 (c)(1),
(2), (4) Date: Dec. 30, 2009

(87) PCT Pub. No.: WO2008/087592
PCT Pub. Date: Jul. 24, 2008

(65) Prior Publication Data
US 2010/0111006 A1    May 6, 2010

Related U.S. Application Data

(60) Provisional application No. 60/885,184, filed on Jan. 16, 2007.

(51) Int. Cl.
*H04W 4/00* (2009.01)
*H04J 3/16* (2006.01)

(52) U.S. Cl.
USPC .......................................... 370/329; 370/465

(58) Field of Classification Search
None
See application file for complete search history.

(56) References Cited

U.S. PATENT DOCUMENTS

| 7,039,445 | B1 | 5/2006 | Yoshizawa | |
|---|---|---|---|---|
| 2004/0202259 | A1* | 10/2004 | Gross et al. | 375/348 |
| 2005/0185732 | A1* | 8/2005 | Mandyam | 375/285 |
| 2005/0288015 | A1 | 12/2005 | Azizi et al. | |
| 2006/0039309 | A1* | 2/2006 | Lee et al. | 370/312 |
| 2007/0072636 | A1* | 3/2007 | Worfolk et al. | 455/502 |
| 2007/0248114 | A1* | 10/2007 | Jia et al. | 370/465 |
| 2007/0287384 | A1* | 12/2007 | Sadri et al. | 455/63.4 |
| 2009/0067389 | A1* | 3/2009 | Lee et al. | 370/336 |
| 2010/0172316 | A1* | 7/2010 | Hwang et al. | 370/330 |

OTHER PUBLICATIONS

Ece Gelal et al., "An integrated Scheme for Fully-Directional Neighbor Discovery and Topology Management in Mobile Ad Hoc Networks", Mobile Ad Hoc and Sensor Systems (MASS), 2006 IEEE International Conference on IEEE, pp. 139-149, XP031003827.
Standard ECMA, "High Rate Ultra Wideband PHY and MAC Standard", vol. ECMA-368, No. ED. 1, Dec. 1, 2005, pp. 186-193, XP003000374.

* cited by examiner

Primary Examiner — John Blanton
(74) Attorney, Agent, or Firm — Larry Liberchuk

(57) ABSTRACT

A communication system includes first and second devices, where a processor of at least one of the first device and the second device is configured to assign a control channel common to the first device and the second device; exchange control information over the control channel; from the control information, find a data channel available to both the first device and the second device for data communications between the first device and the second device; and communicate data over the data channel between the first device and the second device.

33 Claims, 5 Drawing Sheets

MULTI-CHANNEL DIRECTIONAL DEVICES WITH BEACONS

This application claims the benefits of U.S. Provisional Patent Application Ser. Nos. 60/885,184, 60/885,187 and 60/885,192, all filed Jan. 16, 2007, which are all incorporated herein by reference in their entireties.

The present system relates to a system, method, user interface (UI) and device for discovering mixed types of directional terminals within a wireless network and establishing communication between the directional terminals.

As the wireless spectrum becomes more and more significant as a means of maintaining connectivity, the spectrum becomes more and more crowded which can create problems for wireless access and/or interaction points. An idea of ubiquitous communications for devices in mundane device types, such as refrigerators, washing machines, toys, etc. presents not only a problem in spectrum but extending connectivity to these devices presents a further problem in that connectivity needs to be reliable, although not necessarily with any quality of service (QoS) requirements, and must be cheap. Wireless personal area networks (WPANs) are thought to serve this need and are the subject of an IEEE 802.15 working group having several task groups that focus on different parts of this problem.

Omni-directional antennas, such as under the IEEE 802.11 working groups are desirable for tasks such as personal computing and data transfer within a local area network yet require higher cost components that must satisfy at least some aspects of QoS that are not required of WPANs. Further, the power requirements of omni-directional antennas makes them ill-suited for most WPAN applications that typically require lower power, shorter distance transmissions.

Traditional wireless devices equipped with omni-directional antennas broadcast each packet in all directions, as shown by the circular transmission range 100 in FIG. 1. As may be readily appreciated, directional antennas may be utilized that only transmit towards one direction at a time. However, with the same transmission power, directional antennas have much higher antenna gain and transmit to a longer distance, as shown by the cone shaped transmission range 110 in FIG. 1. Of course, less power is needed when using a directional antenna to achieve a range similar to the range of an omni-directional antenna. Wireless devices using directional antennas may also have a simplified design and may be implemented to take advantage of spatial reuse. A WPAN formed by devices that employ directional antennas is referred to as a Directional WPAN or D-WPAN as referred to herein after.

A wireless spectrum is often divided into multiple channels. Devices may communicate over one channel without interfering with communications over other channels, while two concurrent transmissions over the same channel may interfere with each other. Therefore, using multiple channels has the potential to increase the throughput by multiple times. To reduce the complexity of antenna design and hardware cost, some antennas have fixed transmission directions or choose to transmit towards only one direction. These antennas generally can not change transmission direction independently, and can only be changed by a user manipulating a position of the wireless device.

FIG. 2 shows a wireless communication system 200 with a pair of wireless devices 1, 2 having directional antennas for communicating with each other, where the directional antennas face each other so that the wireless devices 1, 2 are within the communication or antenna range of the respective antenna. In particular, the first antenna range 210 of the first device 1 encompasses the second device 2, and the second antenna range 220 of the second device 2 encompasses the first device 1. As shown and may be readily appreciated, by utilizing a fixed directional beam from each of antennas 1, 2, the distance or range of communication may be increased and/or power and component costs may be reduced as compared to the omni-directional antennas discussed above. Fixed directional antennas, for example, are well suited for extending a local area network (LAN) between two locations, such as between two buildings. In this type of a system, each building may include a LAN or a portion thereof. Directional antenna devices may be utilized to bridge the LANs between the buildings with high reliability and without a need to run a fixed (e.g., wired) system between the buildings. Instead of a fixed directional beam, a wireless device may have a directional beam which may be steered toward different directions or sectors, including steering through various sectors to cover a full circle or 360° range. The steering of the directional antenna or beam may be performed manually or automatically, such as disclosed in U.S. Provisional Patent Application Ser. No. 60/885,192.

Before two wireless devices with directional antennas can communicate with each other, they must work on the same channel. Two devices which want to communicate with each other may work at different channels. They may also have different view of the channel availability for communications because communication and interference are location dependent. There is a need for an efficient method for devices to find each other, including finding and selecting a common available channel in order to start data communications between the two devices on the selected channel.

One object of the present systems, methods, communication protocols and devices is to overcome the disadvantages of conventional communication systems and devices. According to one illustrative embodiment, a communication system includes first and second devices, where a processor of at least one of the first device and the second device is configured to assign a control channel common to the first device and the second device; exchange control information over the control channel; from the control information, find a data channel available to both the first device and the second device for data communications between the first device and the second device; and communicate data over the data channel between the first device and the second device.

Further areas of applicability of the present devices, systems and methods will become apparent from the detailed description provided hereinafter. It should be understood that the detailed description and specific examples, while indicating exemplary embodiments of the systems and methods, are intended for purposes of illustration only and are not intended to limit the scope of the invention.

These and other features, aspects, and advantages of the apparatus, systems and methods of the present invention will become better understood from the following description, appended claims, and accompanying drawing where:

The following description of certain exemplary embodiments is merely exemplary in nature and is in no way intended to limit the invention, its applications, or uses. In the following detailed description of embodiments of the present systems and methods, reference is made to the accompanying drawings which form a part hereof, and in which are shown by way of illustration specific embodiments in which the described systems and methods may be practiced. These embodiments are described in sufficient detail to enable those skilled in the art to practice the presently disclosed systems and methods, and it is to be understood that other embodiments may be utilized and that structural and logical changes may be made without departing from the spirit and scope of the present system.

For purposes of simplifying a description of the present system, the term "operatively coupled" and formatives thereof as utilized herein refer to a connection between devices or portions thereof that enables operation in accordance with the present system. For example, an operative coupling may include one or more of a wired connection and/or a wireless connection between two or more devices that enables a one and/or two-way communication path between the devices or portions thereof.

The following detailed description is therefore not to be taken in a limiting sense, and the scope of the present system is defined only by the appended claims. The leading digit(s) of the reference numbers in the figures herein typically correspond to the figure number, with the exception that identical components which appear in multiple figures are identified by the same reference numbers. Moreover, for the purpose of clarity, detailed descriptions of well-known devices, circuits, and methods are omitted so as not to obscure the description of the present system.

In one embodiment, the system uses a fixed channel as a common control channel. Devices advertise and detect each other, and exchange control information over the control channel to find a common available channel for data communications between two or more devices that desire to communicate with each other. A beaconing protocol is used that supports both time-sharing devices and non-time-sharing devices, where time-sharing may include dividing time into slots to support communications between more than one transmitter-receiver pairs over the same channel(s).

A beaconing protocol may be used that has three phases in the timeline. The three phases are neighbor discovery, resource discovery and data communication. In the neighbor discovery phase, devices work on the common control channel. In the resource discovery phase, devices scan all the channels and exchange information over the control channel in order to select a channel which is common and available to the devices that desire to communicate with each other. In the data communication phase, the devices communicate with each other on the selected channel.

Figure 1:
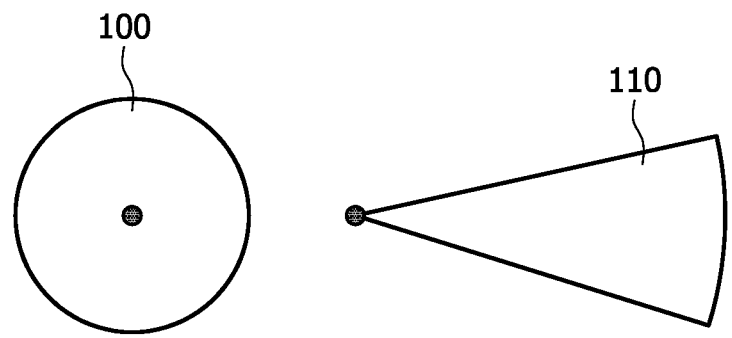
FIG. 1 shows the range of an omni-directional antennas and a directional antenna.
Figure 2:
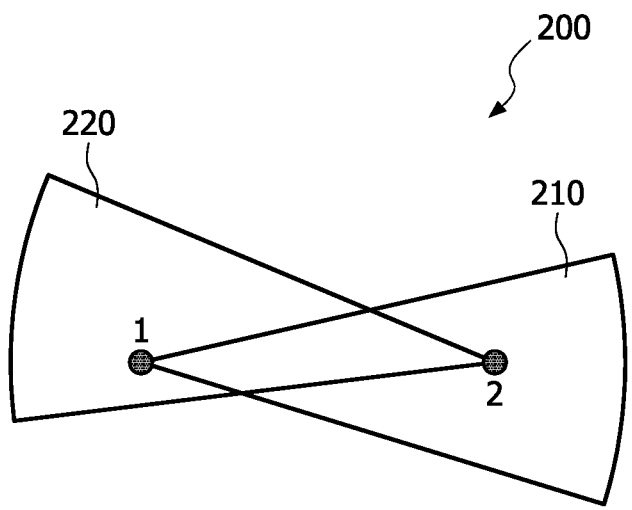
FIG. 2 shows a system with a pair of wireless devices having directional antennas.
Figure 3:
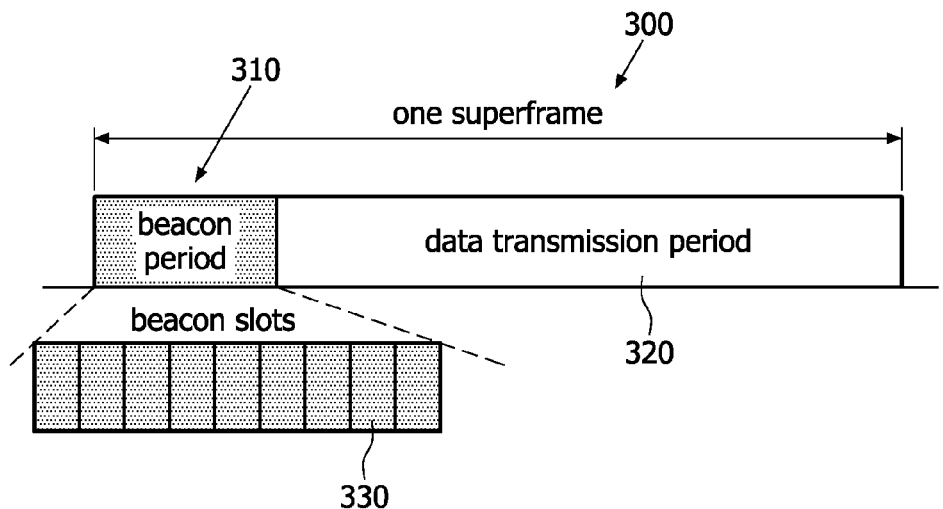
FIG. 3 shows a superframe structure according to one embodiment of the present system.

Before further discussing these three phases, a superframe structure is described according to one embodiment. FIG. 3 shows a superframe structure 300 where each device (such as the two devices 1, 2 shown in FIG. 1) maintains a superframe structure. Each superframe 300 comprises of a beacon period 310 and a data transmission period 320. One beacon period 310 comprises multiple beacon slots 330.

Figure 4:
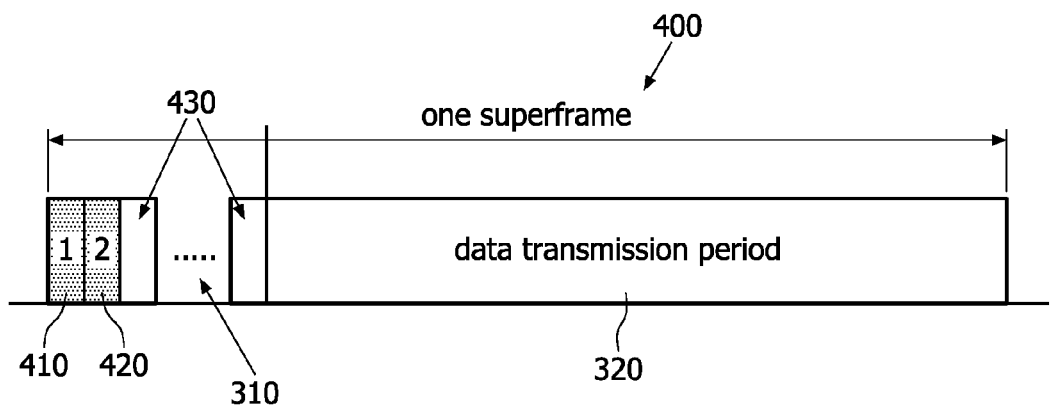
FIG. 4 shows a superframe structure used by two devices in a wireless network according to one embodiment.

It should be understood that although the following description is related to two devices communicating with each other, more than two devices may also communicate among each other. For example, if there are only two devices in the network and they use fixed directions to communicate with each other, such as devices 1, 2 shown in FIG. 1, then the associated superframe 400 may having two beacon slots 410, 420 associated with the two devices 1, 2, as shown in FIG. 4. In this illustrative example, the beacon period 310 starts with a beacon frame 410 of the first device 1 and a beacon frame 420 of the second device 2 followed by multiple empty beacon slots 430.

In the neighbor discovery phase, it is necessary for the two devices 1, 2 to switch/steer their directional antenna towards each other before they can exchange any information. Two options may be used to perform this task of steering the directional antennas towards each other. One is a manual operation by people. The other is automatic steering. As the present systems is not directly related to the various means of automatic steering, in the following description it is assumed that the two devices 1, 2 already switch/steer their antennas towards each other and find each other through beacons transmitted over a control channel during the beacon slots 410, 420, for example. The steering of the directional antenna or beam and neighbor discovery may be performed as disclosed in U.S. Provisional Patent Application Ser. Nos. 60/885,192 and 60/885,187.

The resource discovery phase follows the neighbor discovery phase. After two devices find each other in the neighbor discovery phase, they need to find a common channel with enough resource for data communication and exchange with each other. Once the two devices 1, 2 find each other, whether by manual or automatic steering of their directional antennas to face each other, the devices 1, 2 stay in the direction towards each other in all the following procedures. After they exchange the information on the common control channel to indicate that they want to communicate with each other, the devices 1, 2 stay start to scan one by one channels other than the control channel. Each device 1, 2 stays at one channel for a period Tscan to detect beacons and data frames transmitted from other existing devices working at that channel. It should be noted that the channel scan period Tscan is larger than or equal to the length of a superframe plus the length of one or more beacon slots. After the channel scan period Tscan for a particular channel, the first device 1 concludes whether or not this particular channel is available for its intended communication with the other or second device 2. Upon making the determination of availability of this particular or currently scanned channel, the first device 1 scans another channel. Such scans are repeated by both devices 1, 2 they scan all the channels and each device 1, 2 forms a list of the available of the channels.

After both devices 1, 2 scan all the channels and determine the availability of the channels, the devices 1, 2 come back to the control channel and, during their respective beacon slots 410, 420 and/or their respective data transmission periods 320, the devices 1, 2 exchange between them (on the control channel) the lists of available channels for selection of a channel from the two lists for data communication over the selected channel.

Thus, the devices 1, 2 could use the beacon slots 140, 420 or the data transmission period 320 to exchange the lists of available channels on the control channel after they come back to the control channel. In the phase three, namely, the data communication phase (520 in FIGS. 5 and 660 in FIG. 6), the devices 1, 2 already switch to a new selected channel (if it is different from the common control channel), and transmit beacons also on the new channel C1, and start data communication on the new channel C1 as shown by reference numerals 520, 530 in FIG. 5 and reference numeral 660 in FIG. 6. It should be noted that the newly selected channel for data communication may be the control channel and/or a channel other than the control channel.

If there are one or more common channels in the two lists, the devices 1, 2 choose one channel and jump to that channel to begin the data communication during the data transmission period 320. The selected channel for data communication during the data transmission period 320 may be any channels including the control channel as long as it has enough resource to satisfy both devices 1, 2. However, in this resource discovery procedure, the devices 1, 2 may be configured to favor the selection of a channel other than the control channel. Thus, if possible (e.g., there are available common channels other than the control channel), then the devices 1, 2 may be configured to select one of the common available channels (included in both lists formed by the two devices 1, 2) other than the control channel for the data communication, especially for the non-sharing devices, in order to avoid possible interference between data communication and beacons over the control channel.

The scan results for each channel may be non-sharing availability, sharing-only availability, or busy in the directions that the two devices face towards each other. If there is no communication in these directions, and/or no beacons are detected to announce such communication, then the channel is deemed or categorized and listed on the available channel list(s) to be non-sharing availability. A non-sharing available channel may be used for communication between two non-sharing devices in these directions. If only beacons announcing sharing communication are detected, the scanning result or channel is deemed as sharing-only availability and categorized/listed as such on the available channel list(s). A sharing-only available channel is only available for communication between sharing devices. If any beacons announcing non-sharing communication are detected on a channel, the scanning result or this channel is busy, and this channel is not available for any kinds of communication in these directions.

Before the two devices 1, 2 scan all the channels, they reserve the beacon slots 410, 420 they use for beacon transmission during the beacon periods 310 of superframes 410. The two devices 1, 2 use these beacon slots 410, 420 to exchange information through beacons over the control channel, such as exchanging the available channel lists after they finish scanning other channels for determination and selection of an available common channel for data communication during the data transmission periods 320 of superframes 410.

The reservation message (to reserve beacon slots 410, 420) may be included in the beacons transmitted (during the beacon periods 310) by the devices 1, 2 that wish to communicate and exchange data during the data transmission periods 320 of superframes 410. Other devices may be (concurrently or otherwise) announcing the reservation of the slots for them in their own beacons during the scanning period, such as during the beacon periods 310. If there is no other device over the control channel, then there is no need to reserve the beacon slots 410, 420. The two devices 1, 2 that desire to communicate data over data transmission periods 320 the will keep using the original beacon slots to exchange control information (such as the lists and eventually the selected data communication channel) after they finish the scanning of all or some of the channel for categorization and inclusion in the respective lists used for selecting the data communication channel for data exchange during the data transmission periods 320.

Figure 5:
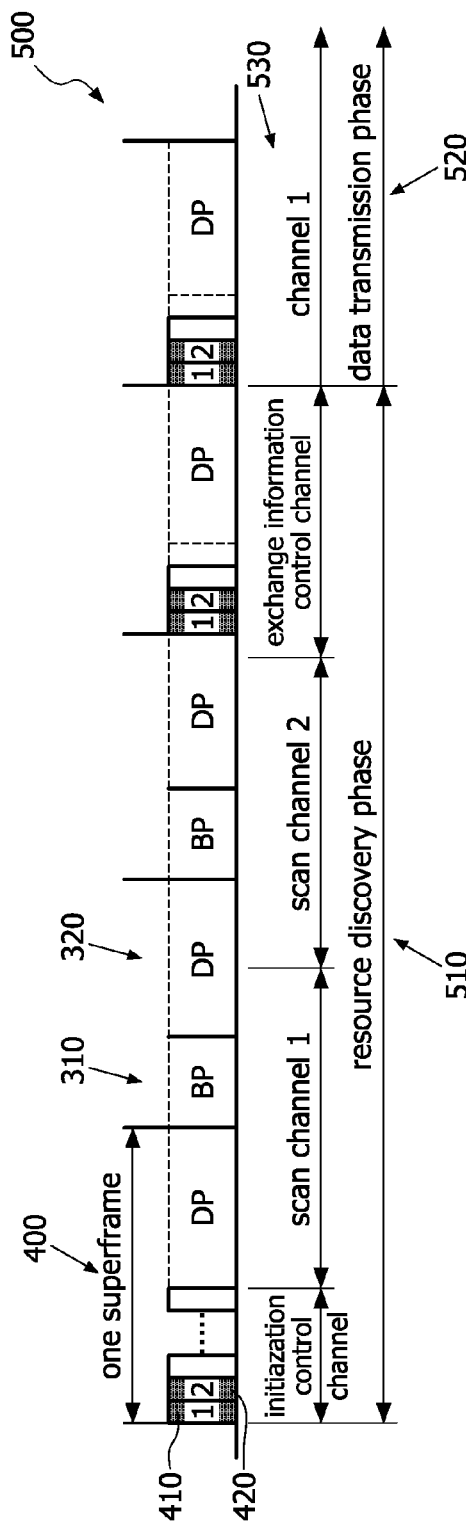
FIG. 5 shows two phases of a beaconing protocol according to another embodiment.

FIG. 5 illustrates an example 500 multiple superframes 300, each having a beacon period (BP) 310 and a data transmission period (DP) 320 associated with the last two phases of the beaconing protocol, namely, the resource discovery phase 510 and the data transmission phase 520. In this example, there are a total of three channels including the control channel (and channels 1 and 2). The selected channel for data transmission is channel 1, as shown in FIG by reference numeral 530.

Figure 6:
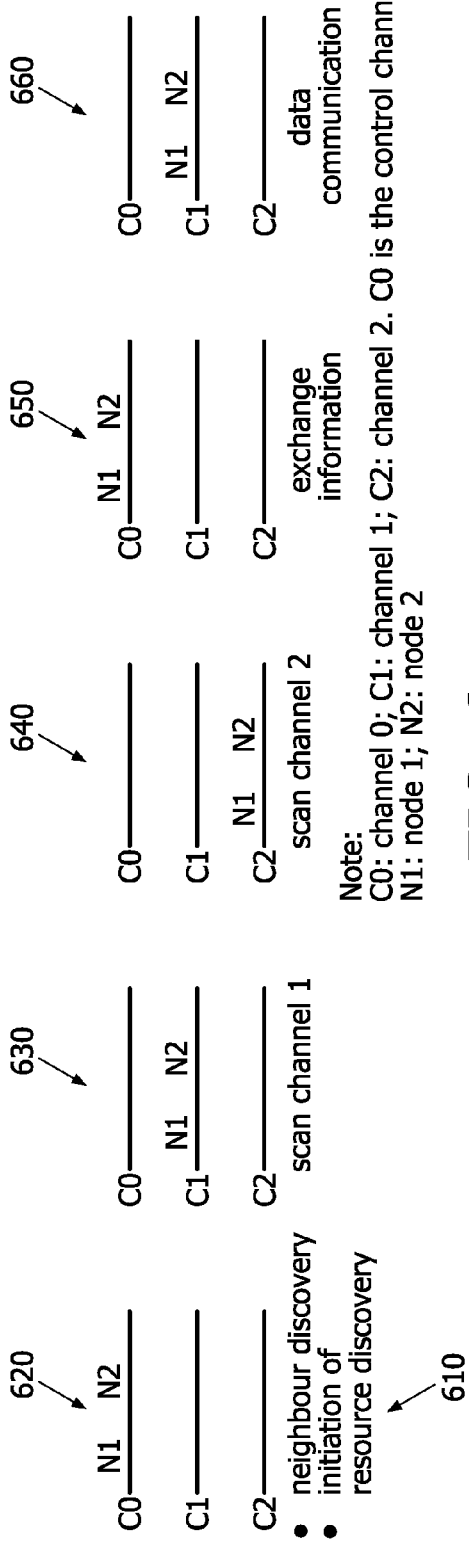
FIG. 6 shows different phases of the beaconing protocol according to a further embodiment.

FIG. 6 shows the three channels C0, C1, C2, and their use by the two devices N1, N2 during the three different phases of the beaconing or communication protocol. As shown in FIG. 6, in the neighbor discovery phase 610, both devices N1, N2 that want to communicate have their fixed directional antenna facing each other, or steer/switch their directional antenna towards each other after which the resource discovery phase 510 is initiated. During the neighbor discovery phase 610 and the beginning of the resource discovery phase 510, both devices or nodes of a wireless network N1, N2, broadcast and communicate over the control channel C0, as shown by reference numeral 620, such as transmitting beacons, including reservation beacons in their respective beacon slots 410, 420 of the beacon period(s) (BP) 410 of a superframe(s) 400.

After the two devices N1, N2 that face each other transmit beacons in beacon slots 410, 420, announcing they want to communicate with each other and other control information, such as reservation signals to reserve the beacon slots 410, 420, the two devices N1, N2 scan the all channels in the direction pointing towards each other. For example, the two devices N1, N2 first scan the first channel 1 (C1), as shown by reference numeral 630, and then scan the second channel 2 (C2), as shown by reference numeral 640. Once all the channels are scanned, in this example being the control channel C0 and two other channels C1, C2, and relevant information is obtained about all the channels and classified and includes in the lists of the two devices N1, N2, such as availability and type such as sharing, non-sharing or busy/not available channels, quality of service, channel capacity, and the like, then the two devices go back to the control channel C0 and communicate using the (reserved or non-reserved) beacon slots 410, 420 of the beacon portion (DP) 310 of a superframe. For example, the two devices N1, N2 transmit and exchange on the control channel C0 their lists during the respective beacon slots 410, 420 and select a common available channel for data communication, as shown by reference numeral 650. In the illustrative example shown in FIG. 6, the two devices N1, N2, select and communicated over the first channel 1 (C1), as shown by reference numeral 660, where data communication is performed over the data transmission portion (DP) 320 of a superframe.

Of course, instead of performing these operations including scanning all the channels in a single fixed direction or sector, the resource discovery phase may also have the option to scan each channel in all directions. In this case, antennas of the scanning devices 1, 2 must be able to switch/steer towards all directions. In each direction, the directional antenna must stay for at least one scan period, Tscan. In this way, the scanning devices 1, 2 know the channel availability in all directions in all channels, which may be used to support more applications, including communication among more than two devices.

In the third or data communication phase 520, the two devices 1, 2 transmit and receive data packets during the data transmission period DP 320 of each superframe 300 over the channel selected by the resource discovery phase.

Of course any desired frequency range may be used for communication in wireless networks, but typically higher frequencies are used particularly when relatively short range is desired to allow multiple wireless devices with directional antennas to use multiple channels with minimal interference. Illustratively, the devices are included in 60 GHz wireless network.

Figure 7:
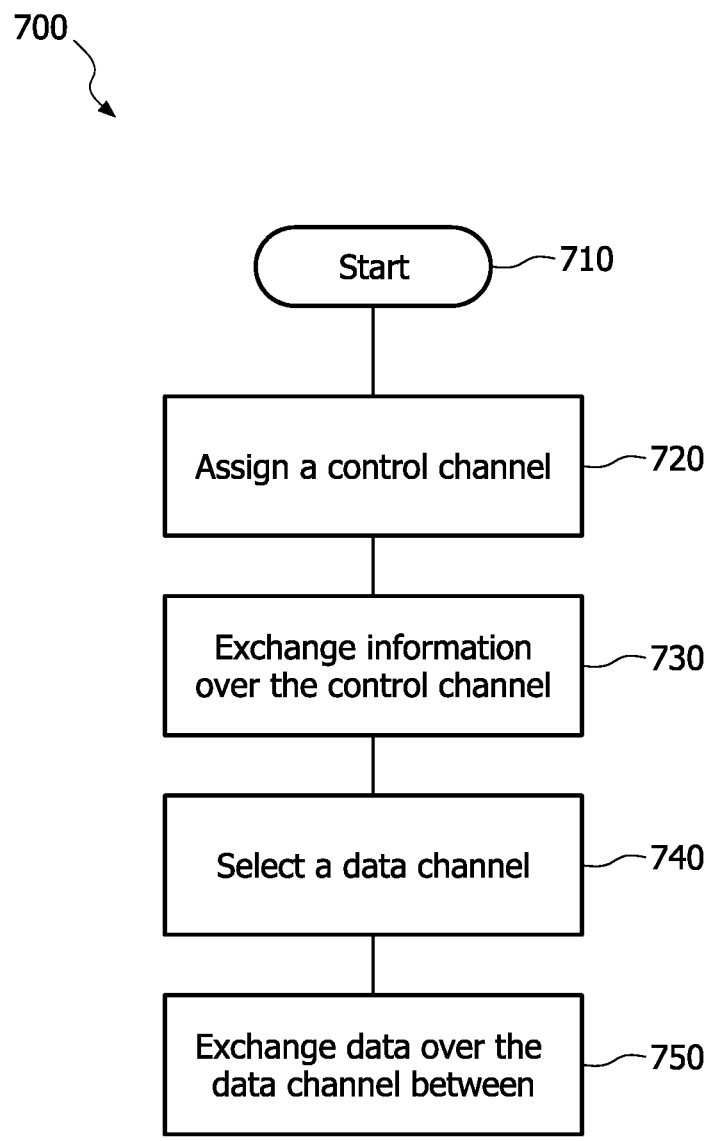
FIG. 7 shows a flow diagram showing a process in accordance with another embodiment.

FIG. 7 shows a flow diagram 700 according to further embodiments. The process starts during act 710 where a fixed and/or steerable devices 1, 2 are powered or turned on and are directed to face each other, such as manually and/or automatically, for example. As described, a fixed control channel common to the two or more devices 1, 2 is obtained or assigned during act 720, where control information are exchanged over the control channel during act 730, such as during beacon slots 410, 420 which may be reserved. During act 740, from the control information, a data channel is selected which is available to both devices 1, 2 for data communications between them, and during act 750, the two or more devices 1, 2 communicate with each other, such as exchange data over the selected data channel.

Figure 8:
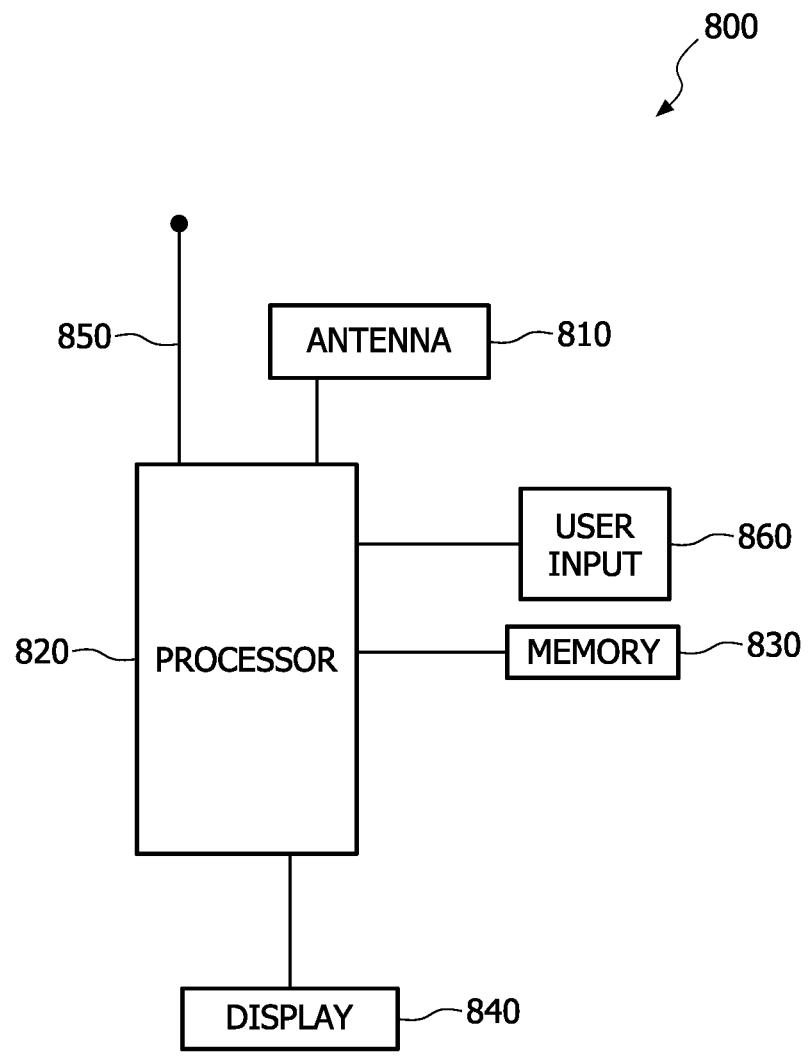
FIG. 8 shows a portion of a device including a directional antenna in accordance with another embodiment of the present system.

The devices 1, 2 that communicate with each other may have a portion shown in FIG. 8. In particular, FIG. 8 shows a portion of a device 800 having an antenna 810 which may be a fixed and/or a steerable directional antenna in accordance with an embodiment of the present system. For example, a portion of the present system 800 may further include a processor 820 operably coupled to a memory 830, a display 840, a wired connection 850, a user input device 860 and the antenna 810. The memory 830 may be any type of device for storing application data as well as other data related to the described operation. The application data and other data are received by the processor 820 for configuring the processor 820 to perform operation acts in accordance with the present system. The operation acts may include powering on, searching available channels and/or sectors for beacons, transmitting beacons, etc. Details of the device 800 are not introduced to simplify the discussion herein although would be apparent to a person of ordinary skill in the art. The device 800, depending on exactly the application, may include the user input or interface 860 and the display 840 to facilitate particular aspects of those embodiments although are not required for operation. For example, a user may provide user inputs via the user interface 860 to turn the device 800 on/off, and steer the antenna 810 towards a desired direction, such as toward another device for communication therewith. The display 840 may be configured to display various data, such as detected channels included in the list of channels, including displaying both lists of channels detected by both devices 1, 2 that desire to communicate with each other, including various characteristics of the channels, such as QoS parameters including bandwidth, signal to noise ratio, intersymbol interference, sharing or non-sharing channels, and the like, associated with each channel, where an optimum channel available to both devices 1, 2 is selected, either automatically bases on the QoS parameters, for example, or manually via user selection and input.

The operational acts of the processor 820 may further include controlling the display 840 to display any other content such as any content that would be applicable to the device 800, such as a user interface. The user input 860 may include a keyboard, mouse, trackball or other device, including touch sensitive displays, which may be stand alone or be a part of a system, such as part of a personal computer, personal digital assistant, mobile phone, set top box, television or other device for communicating with the processor 810 via any operable link. The user input device 860 may be operable for interacting with the processor 860 including enabling interaction within the user interface and/or other elements of the present system. Clearly the processor 820, the memory 830, display 840, antenna 810 and/or user input device 860 may all or partly be a portion of an antenna device or other device for operation in accordance with the present system, such as setting up a communication system including start-up, discovery and communication among a plurality of steerable and non-steerable devices.

The methods of the present system are particularly suited to be carried out by a computer software program, such program containing modules corresponding to one or more of the individual steps or acts described and/or envisioned by the present system. Such program may of course be embodied in a computer-readable medium, such as an integrated chip, a peripheral device or memory, such as the memory 830 or other memory coupled to the processor 820.

The memory 830 configures the processor 820 to implement the methods, operational acts, and functions disclosed herein. The memories may be distributed, for example between the antenna and the processor 820, where additional processors may be provided, may also be distributed or may be singular. The memories may be implemented as electrical, magnetic or optical memory, or any combination of these or other types of storage devices. Moreover, the term "memory" should be construed broadly enough to encompass any information able to be read from or written to an address in an addressable space accessible by the processor 820. With this definition, information accessible through the wired connection 850 (e.g., wired connection to a network such as the Internet) and/or the antenna 810 is still within the memory 830, for instance, because the processor 820 may retrieve the information from one or more of the operable connections 810, 850 in accordance with the present system.

The processor 820 is operable for providing control signals and/or performing operations in response to input signals from the user input device 860 as well as in response to other devices of a network and executing instructions stored in the memory 830. The processor 820 may be an application-specific or general-use integrated circuit(s). Further, the processor 820 may be a dedicated processor for performing in accordance with the present system or may be a general-purpose processor wherein only one of many functions operates for performing in accordance with the present system. The processor 820 may operate utilizing a program portion, multiple program segments, or may be a hardware device utilizing a dedicated or multi-purpose integrated circuit. Further variations of the present system would readily occur to a person of ordinary skill in the art and are encompassed by the following claims.

Of course, it is to be appreciated that any one of the above embodiments or processes may be combined with one or more other embodiments and/or processes or be separated and/or performed amongst separate devices or device portions in accordance with the present system.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

What is claimed is:

1. A method for communication comprising:
    assigning a control channel common to a first device and a second device;
    scanning a first set of channels by the first device;
    scanning a second set of channels by the second device;
    exchanging control information over the control channel between the first device and the second device, the control information being based upon the scanning of the first device and the scanning of the second device;
    from the control information, finding a data channel available to both the first device and the second device for data communications between the first device and the second device by selecting an optimal data channel for use in communicating, the optimal data channel having optimal characteristics satisfying a desired intersymbol interference; and
    communicating data over the data channel between the first device and the second device.

2. The method of claim 1, wherein the finding include:
    determining first characteristics of the first set of channels by the first device;
    including in a first list the first set of channels scanned by the first device and the first characteristics;
    determining second characteristics of the second set of channels by the second device;
    including in a second list the second set of channels scanned by the second device and the second characteristics; and
    exchanging the first list and the second list between the first device and the second device.

3. The method of claim 2, further comprising selecting the data channel from available channels that are available and common to the first list and the second list.

4. The method of claim 2, wherein the exchanging is performed over the control channel.

5. The method of claim 1, wherein the data channel is at least one of a shared channel and a non-shared channel.

6. The method of claim 1, wherein the control information includes beacons exchanged between the first device and the second device to advertise and detect each other.

7. The method of claim 1, wherein the optimal data channel further includes optimal characteristics of satisfying a desired bandwidth and a desired signal to noise ratio.

8. The method of claim 1, wherein the control information are exchanged during a beacon period of a superframe and the data are exchanged during a data transmission period of the superframe.

9. The method of claim 1, further comprising reserving beacon slots in a beacon period of a superframe for exchanging beacons over the control channel.

10. The method of claim 9, wherein the beacons include a first beacon transmitted by the first device in a first beacon slot of the beacon period and a second beacon transmitted by the second device in a second beacon slot of the beacon period.

11. The method of claim 1, wherein at least one of the control channel and data channel is divided into time slots for sharing with further devices.

12. The method of claim 1, wherein at least one of the first device and the second device has a directional antenna and face each other.

13. A communication system comprising a first device and a second device, wherein a processor of at least one of the first device and the second device is configured to:
    assign a control channel common to the first device and the second device;
    scan a first set of channels by the first device;
    scan a second set of channels by the second device;
    exchange control information over the control channel between the first device and the second device, the control information being based on the scan of the first device and the scan of the second device;
    from the control information, find a data channel available to both the first device and the second device for data communications between the first device and the second device by selecting an optimal data channel for use in communicating, the optimal data channel having optimal characteristics satisfying a desired intersymbol interference; and
    communicate data over the data channel between the first device and the second device.

14. The communication system of claim 13, wherein the processor is further configured to find the data channel by:
    determining first characteristics of the first set of channels;
    including in a first list the first set of channels scanned by the first device and the first characteristics;
    determining second characteristics of the second set of channels;
    including in a second list the second set of channels scanned by the second device and the second characteristics; and
    exchanging the first list and the second list between the first device and the second device.

15. The communication system of claim 14, wherein the processor is further configured to select the data channel from available channels that are available and common to the first list and the second list.

16. The communication system of claim 14, wherein the processor is further configured to exchange the first list and the second list over the control channel.

17. The communication system of claim 13, wherein the control information includes beacons exchanged between the first device and the second device to advertise and detect each other.

18. The communication system of claim 13, wherein the control information are exchanged during a beacon period of a superframe and the data are exchanged during a data transmission period of the superframe.

19. The communication system of claim 13, wherein the processor is further configured to reserve beacon slots in a beacon period of a superframe for exchanging beacons over the control channel.

20. The communication system of claim 19, wherein the beacons include a first beacon transmitted by the first device in a first beacon slot of the beacon period and a second beacon transmitted by the second device in a second beacon slot of the beacon period.

21. The communication system of claim 13, wherein at least one of the control channel and data channel is divided into time slots for sharing with further devices.

22. The communication system of claim 13, wherein at least one of the first device and the second device has a directional antenna and face each other.

23. A communication device comprising a processor configured to:
   assign a control channel common to the communication device and a further device;
   scan a first set of channels;
   exchange control information with the further device over the control channel, the control information being based upon the scan and a scanning by the further device of a second set of channels;
   from the control information, find a data channel available to both the communication device and the further device for data communications between the communication device and the further device by selecting an optimal data channel for use in communicating, the optimal data channel having optimal characteristics satisfying a desired intersymbol interference; and
   communicate data over the data channel between the communication device and the further device.

24. The communication device of claim 23, wherein the processor is further configured to find the data channel by:
   determining first characteristics of the first set of channels;
   including in a first list the first set of channels scanned by the communication device and the first characteristics; and
   exchanging with the further device the first list and a second list generated by the further device that includes the second set of channels and second characteristics of the second set of channels.

25. The communication device of claim 23, wherein the processor is further configured to select the data channel from available channels that are available and common to the first list and the second list.

26. The communication device of claim 23, wherein the processor is further configured to exchange the first list and the second list over the control channel.

27. The communication device of claim 23, wherein the control information includes beacons exchanged between the communication device and the further device to advertise and detect each other.

28. The communication device of claim 23, wherein the control information are exchanged during a beacon period of a superframe and the data are exchanged during a data transmission period of the superframe.

29. The communication device of claim 23, wherein the processor is further configured to reserve beacon slots in a beacon period of a superframe for exchanging beacons over the control channel.

30. The communication device of claim 29, wherein the beacons include a first beacon transmitted by the communication device in a first beacon slot of the beacon period and a second beacon transmitted by the further device in a second beacon slot of the beacon period.

31. The communication device of claim 23, wherein at least one of the control channel and data channel is divided into time slots for sharing with additional devices.

32. The communication device of claim 23, wherein at least one of the communication device and the further device has a directional antenna and face each other.

33. A computer program product stored on a non-transitory computer readable medium, the computer program when executed by a processor is configured to:
   assign a control channel common to a first device and a second device;
   scan a first set of channels by the first device;
   scan a second set of channels by the second device;
   exchange control information over the control channel between the first device and the second device, the control information being based upon the scan of the first set of channels and the scan of the second set of channels;
   from the control information, find a data channel available to both the first device and the second device for data communications between the first device and the second device by selecting an optimal data channel for use in communicating, the optimal data channel having optimal characteristics satisfying a desired intersymbol interference; and
   communicate data over the data channel between the first device and the second device.

* * * * *